3,840,490
CYANOACRYLATE NAIL COATING COMPOSITION
Antoni E. Gadzala, Suffern, N.Y., and James F. Kinney, Ramsey, N.J., assignors to Avon Products, Inc.
No Drawing. Filed Aug. 18, 1972, Ser. No. 281,753
Int. Cl. C08g 51/36, 51/56
U.S. Cl. 260—31.2 N                    1 Claim

ABSTRACT OF THE DISCLOSURE

An improved composition and method of hardening, mending or toughening nails for purposes of repairing the nails and/or increasing the resistance of the nails to cracking, splitting, delaminating or similar nail damage and to assist the healing of nails so damaged comprising applying to the nail a composition comprising an autopolymerizable cyanoacrylate monomer and an anhydrous polymerization inhibitor in an amount sufficient to prevent any substantial tackiness of the composition during polymerization. Preferably, the composition includes an anhydrous solvent for such monomer. The method comprises polymerizing the monomer in situ to form an adherent coating of the polymer on the nail.

BACKGROUND OF THE INVENTION

Nails are susceptible to embrittling and cracking, delamination, splitting, ridging and the like, which conditions will vary in severity dependent upon the age and condition of the nails of the particular individual. Such damage also often occurs in the occupational exposure of industrial workers and to housewives due to extensive wetting of their hands with chemicals or strong alkaline waters such as soaps, detergents, solvents, hair waving and coloring solutions. Damage also often occurs because of deliberate cosmetic treatments to soften the surrounding skin and wetting the nails as by manicuring, including softening the cuticle with chemicals whereby the subsequently dried nails tend undly to crack, delaminate, and the like. It is also known that the natural hardness and strength of nails is variable with different individuals and that those having inherently soft nails are more subject to splitting and cracking due to the stresses of everyday usage.

Some products have, in the past, been marketed as nail strengthening materials but, as of the present, none has been completely effective. The major problem with the nail strengthening materials known in the past is that they are really a surface protective material and, therefore, are easily removable from the nails to be protected.

For example, conventional nail enamels have been tried as protective coatings, but these enamels normally contain substantial quantities of cellulose nitrate and are frequently characterized by an undesirable tendency to shrink during drying and to peel during usage. Various other nail coating compositions have been used in which the sandarac and the like as well as synthetic resinous materials in attempts to form a more long lasting and durable coating. In some cases, these additional materials have been natural resins such as dammar gum, mastic, sandarac and the like as well as synthetic resinous materials as formaldehyde resins, urea-formaldehye resins, melamines and various other polymeric materials. In addition, powdered keratin has been added to nail coating compositions in attempts to make the coating more cohesive with the nails which are being strengthened. Not infrequently the conventional coatings in these various categories have proven objectionable, if not demonstrably harmful, for various reasons, important among which are basic incompatibilities between the coating and the composition of natural nail.

SUMMARY OF THE INVENTION

The present invention provides an improved coating process and a composition, which composition forms a coating that firmly bonds to the nail and obviates difficulties of the kind heretofore experienced and described above with respect to other nail-treating compositions.

Briefly stated, the present invention is directed to a nail coating composition comprising a hydrophilic polymerizable cyanoacrylate monomer and an anhydrous polymerization inhibitor in an amount sufficient to prevent any substantial tackiness of the composition during polymerization of the monomer. In a preferred embodiment, the composition includes an anhydrous solvent for such monomer.

The method of the present invention comprises applying the above-noted composition to the nail and permitting polymerization to take place under ambient conditions.

DETAILED DESCRIPTION OF THE INVENTION

The composition must contain an autopolymerizable cyanoacrylate monomer and an anhydrous inhibitor of polymerization of the monomer in the proportion noted; also, preferably, an anhydrous solvent.

As to the cyanoacrylate, it can be any of the 2-cyanoacrylates known and used in adhesive compositions which autopolymerize rapidly in the presence of moisture. Such monomers have the general formula

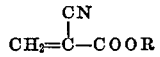

wherein R is a radical such as a substituted or unsubstituted $C_1$-$C_{18}$ alkyl, $C_1$-$C_{18}$ alkoxyalkyl, cyclohexyl, phenyl, allyl and the like. U.S. Pats. 2,467,251; 2,467,926; 2,467,927; 2,784,215; 2,794,788; and 3,577,394 describe a wide variety of such monomers. Some specific examples are methyl-2-cyanoacrylate, n-butyl-2-cyanoacrylate, 2-chloroethyl - 2-cyanoacrylate, cyclohexyl-2-cyanoacrylate, phenyl - 2-cyanoacrylate, capryl-2-cyanoacrylate, allyl-2-cyanoacrylate, amyl - 2-cyanoacrylate, 2-thiopropyl-2-cyanoacrylate, methoxy butyl-2-cyanoacrylate, $\beta,\beta,\beta$-trifluoroisopropyl - 2-cyanoacrylate, isopropyl-2-cyanoacrylate, and mixtures thereof.

With respect to the anhydrous solvent, any solvent for the monomer which will vaporize at ambient temperature can be used. Toluene, acetophenone, propiophenone, heptanone, cyclopentanone, benzophenone, 5 - methyl-2-hexanone, benzene, acetone, hexane, nitroethane, ad methyl ad ethyl acetate are some specific examples, with ethyl acetate being preferred.

The polymerization inhibitor must also be anhydrous and can be any conventionally used for this purpose with cyanoacrylate monomers and having a pK of about 4.7 or lower. Such inhibitors exhibit an acidic reaction and include hydrogen fluoride, phosphorous pentoxide, metaphosphoric acid, acetic acid, mono-, di-, and trichloroacetic acid, and acidic gases such as sulfur dioxide, gaseous hydrogen chloride and gaseous nitric acid.

In addition to the necessary components, it is also essential that the inhibitor be present in an amount sufficient to prevent any substantial tackiness of the composition during polymerization of the monomer. Stated differently, the composition must be, at most, barely sticky to the touch up to complete polymerization without preventing film formation. As presently used for adhesive purposes, the cyanocrylate monomers are extremely sticky to the touch and it is this property that has made them useful as adhesives. In the instant compositions, such property is undesirable. While the specific amount of inhibitor necessary to achieve the substantially non-tacky effect will vary dependent upon the particular inhibitor and cyanoacrylate monomer used, ordinarily at least about 10 parts by weight of inhibitor for each 100 parts by weight of monomer, are sufficient to give the necessary effect. It is not desired to use amounts of inhibitor much above that required to give the desired effect since such larger amounts may unduly delay polymerization of the monomer making the compositions commercially unsatisfactory.

The proportion of solvent used may vary from about 5 to about 600 parts by weight for each 100 parts by weight of monomer, but levels of solvent much above 300 parts tend to result in weaker polymerized films.

Additional components such as fillers, stabilizers, coloring agents, thickeners and the like conventionally used in nail enamels may also be added to the instant compositions for their usual and intended purposes. The amounts thereof used are those conventional for nail enamels and are not found to adversely affect the desired properties of the monomer-solvent-polymerization inhibitor composition.

The compositions of the instant invention are applied to the nail in any usual manner, as by brushing on the portion of the nail desired to be treated. The monomers of the instant invention, as previously noted, polymerize without the application of heat or pressure and need only the moisture normally present in the atmosphere. Dependent upon the amount of polymerization inhibitor, polymerization can be essentially complete in anywhere from about one to five minutes to form a hard coating firmly adhered to the nail.

While the precise theory is not completely understood, it is believed that the amino groups of the nail keratin interact with the cyanoacrylate monomer during polymerization of the monomer, thereby resulting in the firm bonding of the polymerized cyanoacrylate to the nail. The polymerized cyanoacrylate forms a very strong coating, thus giving great strength to the nail.

The invention will be further described in connection with the foregoing examples which are set forth for purposes of illustration only, and in which all proportions are in parts by weight unless otherwise specifically indicated.

EXAMPLE 1

A composition is prepared having the following formulation:

| | Parts by weight |
|---|---|
| Methyl-2-cyanoacrylate | 22.5 |
| Anhydrous $SO_2$ | 2.5 |
| Anhydrous Ethyl Acetate | 75.0 |
| | 100.0 |

The cyanoacrylate and $SO_2$ are first combined and the acetate then added.

Slivers of hydrated bovine nail, all of equal thickness and approximately 3 mm. wide by 0.4 inch long, are coated with the above composition left thereon at ambient temperature and pressure until dry (about 5 minutes). There is substantially no tackiness of the coating during this time. Such slivers are then tested for strength after 2 hours and 24 hours soaking in water on a tensile tester (Instron) which flexes the sliver. Such results are compared with said hydrated bovine nail slices which are tensile tested in the same manner, prior to coating with the noted composition.

The treated nails are not only stronger immediately after thorough hydration (2 hours), but the strength of the treated nails increases further even upon prolonged rehydration.

EXAMPLE 2

A composition is prepared by combining the noted components in the proportions set forth. The $SO_2$ is first combined with the monomer and the ethyl acetate then added.

| | Parts by weight |
|---|---|
| Methyl-2-cyanoacrylate | 40.0 |
| Anhydrous $SO_2$ | 10.0 |
| Anhydrous Ethyl Acetate | 50.0 |
| | 100.0 |

Strength tests are performed on treated and untreated bovine nail slices as set forth in Example 1 and the treated nails show a substantial increase in strength.

EXAMPLE 3

The composition and procedure of Example 1 are followed except that there is substituted, separately and in turn, for the methyl-2-cyanoacrylate an equivalent amount of each of the following:

n-butyl-2-cyanoacrylate,
2-chloroethyl-2-cyanoacrylate,
cyclohexyl-2-cyanoacrylate,
phenyl-2-cyanoacrylate,
capryl-2-cyanoacrylate,
allyl-2-cyanoacrylate,
amyl-2-cyanoacrylate,
3-methoxy butyl-2-cyanoacrylate,
$\beta,\beta,\beta$-trifluoro-isopropyl-2-cyanoacrylate,
isopropyl-2-cyanoacrylate, and
a mixture of isobutyl-2-cyanoacrylate with amyl-2-cyanoacrylate.

In each case nails of increased strength are obtained.

EXAMPLE 4

The composition and procedure of Example 1 are followed except that for the $SO_2$ used therein there is substituted, separately and in turn, an equivalent anhydrous amount of each of gaseous hydrogen chloride; gaseous nitric acid; glacial acetic acid; mono-, di- and trichloroacetic acid; hydrogen fluoride, phosphorous pentoxide; and metaphosphoric acid.

In each case nails of increased strength are obtained.

EXAMPLE 5

The composition and procedure of Example 1 are followed except that for the ethyl acetate used therein there is substituted, separately and in turn, an equivalent anhydrous amount of each of the following:

Toluene, acetophenone, propiophenone, heptanone, cyclopentanone, benzophenone, benzene, acetone, hexane, nitroethane, 5-methyl-2-hexanone, and methyl acetate.

In each case, substantially non-tacky initial coatings are formed which dry to form nails of increased hardness.

While the invention has been described in connection with a preferred embodiment, it is not intended to limit the invention to the particular form set forth, but, on the contrary, it is intended to cover such alternatives, modifications, and equivalents as may be included within the spirit and scope of the invention as defined by the appended claim.

What is claimed is:

1. A nail coating composition comprising an autopolymerizable cyanoacrylate monomer, from about 5 to about 600 parts by weight per 100 parts by weight of monomer of an anhydrous solvent for said monomer and at least about 10 parts by weight per 100 parts by weight of monomer of an anhydrous inhibitor of polymerization, said inhibitor being present in an amount sufficient to prevent any substantial tackiness of the composition during polymerization of the monomer.

References Cited

UNITED STATES PATENTS

| 3,564,078 | 2/1971 | Wicker | 260—881 |
| 2,784,215 | 9 1957 | Joyner | 260—465.4 |
| 3,607,816 | 9/1971 | Holzer | 260—312 X |
| 3,705,076 | 12/1972 | Usala | 260—31.2 NX |
| 3,559,652 | 2/1971 | Banett | 128—334 |
| 3,282,774 | 1/1966 | Wicker | 161—188 |

ALLAN LIEBERMAN, Primary Examiner

R. ZAITLEN, Assistant Examiner

U.S. Cl. X.R.

260—78.4 N; 424—45

UNITED STATES PATENT OFFICE
CERTIFICATE OF CORRECTION

Patent No. 3,840,490          Dated October 8, 1974

Inventor(s) Antoni E. Gadzala and James F. Kinney

It is certified that error appears in the above-identified patent and that said Letters Patent are hereby corrected as shown below:

Column 1, line 40, "undly" should read --unduly--.

Column 1, line 56, after "the" the following has been omitted and should be inserted:

--cellulose nitrate base has been altered with
  additional materials in attempts to form a
  more long lasting and durable coating.  In
  some cases, these additional materials have
  been natural resins such as dammar gum, mastic,--.

Column 2, line 46, "ad" should read --and--.

Column 2, line 64, "cyanocrylate" should read --cyanoacrylate--.

Signed and sealed this 28th day of January 1975.

(SEAL)
Attest:

McCOY M. GIBSON JR.          C. MARSHALL DANN
Attesting Officer            Commissioner of Patents